United States Patent [19]

Zaenkert

[11] Patent Number: 5,077,906
[45] Date of Patent: Jan. 7, 1992

[54] SURVEYING ROD LEVELING DEVICE

[76] Inventor: Robert C. Zaenkert, 7461 Cincinnati Brookville Rd., Okeana, Ohio 45053

[21] Appl. No.: 688,731

[22] Filed: Apr. 19, 1991

[51] Int. Cl.[5] ............................................. G01C 25/00
[52] U.S. Cl. ...................................... 33/392; 73/1 E; 73/384; 73/295
[58] Field of Search ................... 73/1 R, 1 E; 33/391, 33/392, 395, 385, 384, 295

[56] References Cited

U.S. PATENT DOCUMENTS

| | | | |
|---|---|---|---|
| 1,912,536 | 6/1933 | Mobley | 33/392 |
| 4,617,820 | 10/1986 | Hammond | 73/1 E |
| 4,879,816 | 11/1989 | Sierk | 33/295 |

Primary Examiner—Harry N. Haroian

[57] ABSTRACT

A surveying rod leveling device and method for checking the accuracy of the level attached to the surveying rod comprising an elongated vertical bracket mounted to a vertical surface, having a movable joint at the top of the bracket and an adjustable horizontal plate with a center point at the bottom of the bracket. A plumb line and bob hangs from the movable joint. The center point of the adjustable bottom plate is aligned with the point of the plumb bob and the bottom plate is secured in place. The center point is removed from an aperture is the adjustable horizontal plate and the surveying rod is inserted into the same aperture. The upper end of the rod is secured to the joint at the top plate. The rod is thus held plumb and the level attached to the rod may be adjusted to produce an accurate reading.

5 Claims, 2 Drawing Sheets

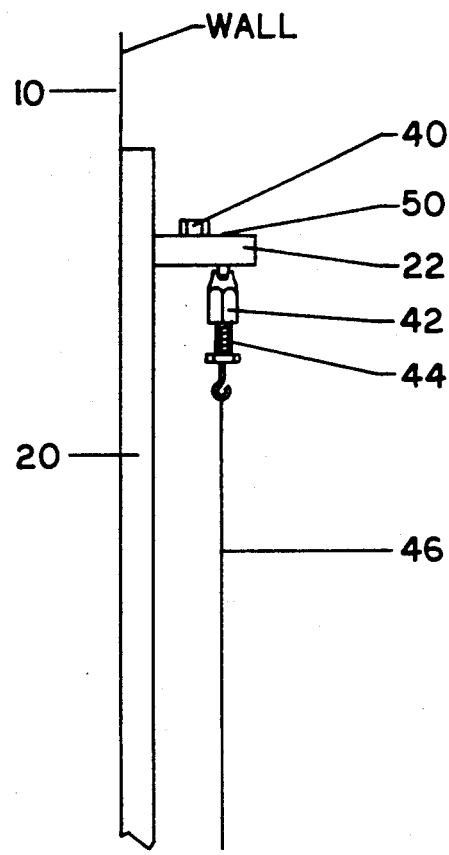
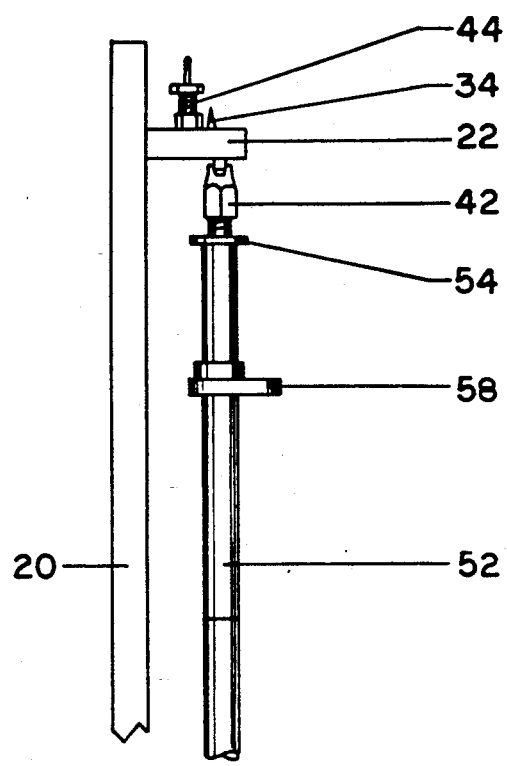
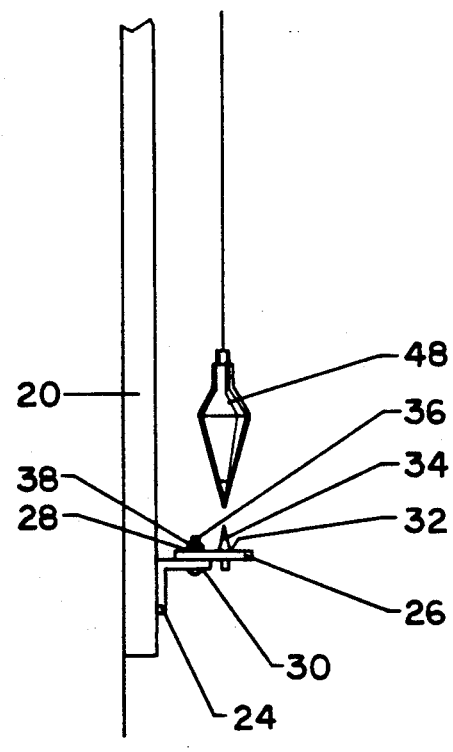
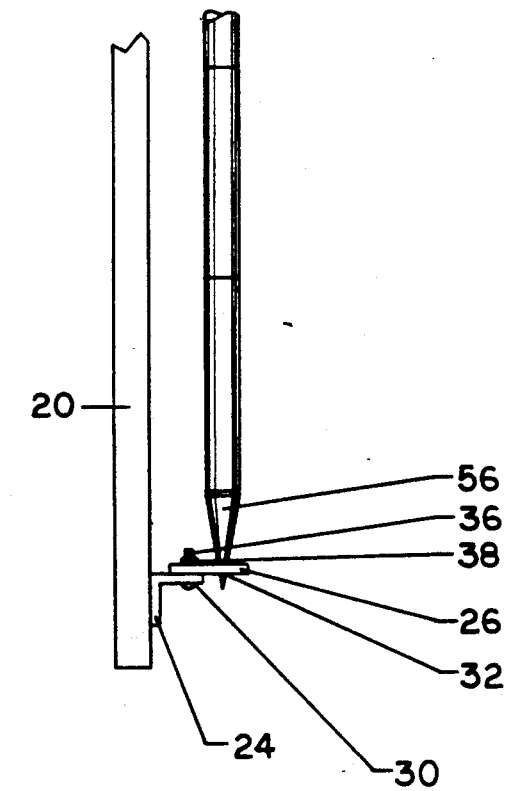
FIG 1
FIG 2

SURVEYING ROD LEVELING DEVICE

BACKGROUND OF THE INVENTION

1. Field of the Invention

The present invention relates to surveying rod leveling instruments and more particularly to a device which can be used to check the accuracy of the level attached to a surveying rod.

2. Description of the Prior Art

Levels attached to surveying rods have been used for many years to ensure that the surveying rod is level when measurements are taken. Accuracy is extremely important in the art of surveying because even small errors can result in liability of the surveyor. Over time, however, levels attached to surveying rods can lose accuracy due to jostling and bouncing. It is even possible that new rods have levels that have not been properly calibrated at the factory. It is therefore desirable to have a device which provides a means for ensuring accuracy of the level attached to the surveying rod.

U.S. Pat. No. 4,617,820 issued to Hammond for "Level Calibrating Device" describes a pair of orthogonal horizontal and vertical reference surfaces which are mounted by a bracket to a solid support. An adjustment is provided so that when the mounting bracket is appropriately mounted, the reference surfaces can be adjusted to precisely horizontal and vertical. A plumb bob shows when the surfaces are precisely aligned. The device is then used to check a carpenter,s square or similar instrument. The Hammond device is designed for hand levels and is not suitable or adaptable for the surveying rod levels.

Digricinto, U.S. Pat. No. 2,788,578 discloses a surveyor's target staff with a plumb line for leveling the target in the field. This device is also not suited for surveying rods.

U.S. Pat. No. 3,8789,852, issued to Biondi, describes a vertical positioning device for locating a point at one elevation with respect to a different elevation.

U.K. Patent 1,455,868 discloses a plumb line positioning and holding device used for checking the vertical alignment of top and bottom pivots of a door. U.K. Patent Publication No. 1,455,868 published Nov. 19, 1974, Japanese patent Publication No. 52-17850 published on Feb. 10, 1977 and Japanese Patent Publication No. 62-35219 published on Feb. 16, 1987 all show state of the art for leveling devices.

SUMMARY OF THE INVENTION

One object of the present invention is to provide surveyors' with a device to check the accuracy of the levels attached to their surveying rods.

Another object of this invention is to provide a method for calibrating levels attached to surveying rods.

A further object of this invention is to provide a surveying rod level calibrating device which can be relatively permanently installed so as to allow surveyors to make daily, weekly or periodic checks of the levels attached to their surveying rods.

Yet another object of this invention is to provide a device for calibrating levels on surveying rods which is quick, easy and accurate.

Still a further object of this invention is to provide a means for calibrating levels on survey rods which can be operated by a single person.

In accordance with the above objects, this invention is a surveying rod leveling device comprising an elongated bracket mounted to a vertical surface having top and bottom horizontal plates mounted at right angles onto the bracket. The top horizontal plate has a movable joint for securing means for hanging a plumb line and bob or alternately securing the surveying rod. The bottom horizontal plate contains an aperture to receive a center point and means to adjust the plate to and from the bracket and as a radius around the aperture so that the center point is aligned with the plumb bob.

BRIEF DESCRIPTION OF THE DRAWINGS

The above and further objects of this invention will become more readily apparent as the invention is more completely understood from the following detailed description, reference being made to the accompanying drawings wherein reference numerals represent like parts throughout and wherein:

FIG. 1 is a side elevational view of the surveying rod leveling device according to the present invention depicting the use of the plumb line and bob;

FIG. 2 is a side elevational view of the level checking device showing the use of the surveying rod on the invention;

DESCRIPTION OF THE PREFERRED EMBODIMENT

Figure 3:
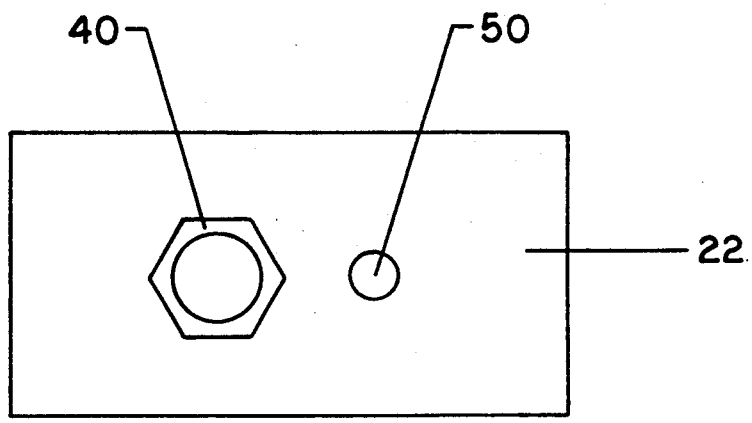
FIG. 3 is a top view of the top horizontal plate.
Figure 4:
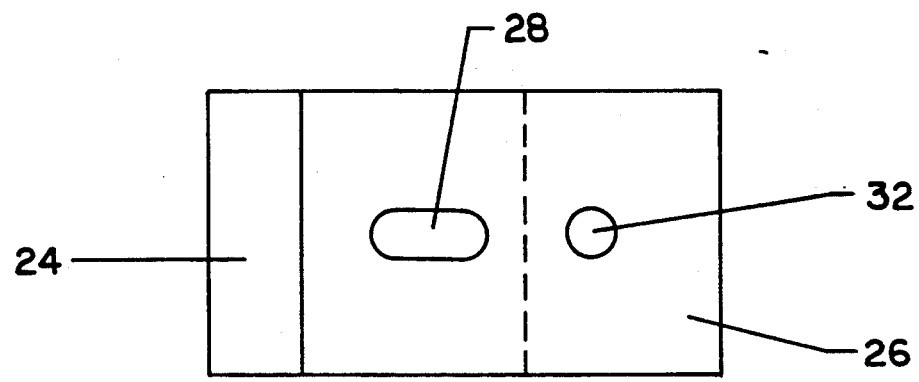
FIG. 4 is a top view of the bottom adjustable horizontal plate.

With reference to FIG. 1, the surveying rod leveling device is seen to compromise an elongated vertical bracket (20) and a top horizontal plate (22) and an adjustable bottom horizontal plate (24, 26) mounted to a vertical surface (10) such as a wall.

The bracket (2) is formed of sheet metal, cast aluminum, plastic or other suitable material. The top horizontal plate (22) is made from similar material and is mounted in a fixed right angle position to the bracket (20). The bottom horizontal plate (24, 26) is also made out of material similar to the bracket (20) and is mounted at right angles to the bracket (20). The bottom horizontal plate consists of an L-shaped member (24) fixably mounted to the bracket (20) and an adjustable flat piece (26) movably mounted to the L-shaped member (24).

The L-shaped member (24) of the bottom horizontal plate (24, 26) has an aperture (30) through which a bolt (36) passes. The flat piece (26) of the bottom plate (24, 26) has a slotted opening (28) through which a bolt (36) passes. The slot permits adjustment of the flat member (26) towards and away from the bracket (20) and around a radium emanating from the bolt (36). A nut (38) secures the bolt (36) and therefore the flat member in place. The flat member (26) of the bottom plate also contains an aperture (32) to receive a center point (34).

The top horizontal plate (22) contains an opening (40) on its top to receive the means (44) for hanging a plumb line (46) and plumb bob (48) when the means are not in use. The top horizontal plate (22) also contains as aperture to hold the center point (34) when it is not in use.

In order to calibrate a level on a surveying rod, the bracket (20) must be suitably mounted on a vertical surface (10) such as a wall. Means (44) for hanging a plumb line (46) and a plumb bob (48) is secured into the movable joint (42) affixed to the top horizontal plate (22). The plumb line (46) with the plumb bob (48) is dropped to within an inch or so of the bottom horizontal plate (24, 26).

A center point (34) is placed in an aperture (32) on the flat member (26) of the horizontal plate (24, 26) which is adjusted so that the center point (34) is aligned with the bottom of the plumb bob (48). The nut (38) is tightened thereby securing the flat member (26) of the bottom horizontal plate (24, 26).

The plumb line (46) and plumb bob (48) are removed as is the means (44) for hanging them. The means (44) for hanging the plumb line (46) may be conveniently stored in a receptacle (40) on the tope of the top horizontal plate (22). Likewise, the center point (34) is removed from the bottom horizontal plate and stored in an aperture (50) on top of the top horizontal plate (22).

The tip or point (56) of a surveying rod (52) is inserted in an aperture (32) on the bottom horizontal plate (24, 26) the rod (52) has means (54) for securing the rod to the movable joint (42) and a level (58) attached. The rod (52) is secured to the movable joint (42). The rod (52) is now plumb and the level (58) may now be checked for trueness and accuracy.

If the bubble in the level is not centered when the rod is in place in the device, adjustments may be made to the level to obtain an accurate reading.

The foregoing description is provided for illustrating purposes only and is not considered limiting. Numerous additions, substitutions and other modifications can be made without departing from the scope of the present invention.

I claim:

1. A surveying rod leveling device comprising:
   an elongated bracket for mounting said device to a vertical surface;
   a top horizontal plate mounted at a right angle on said bracket;
   an adjustable bottom horizontal plate mounted at a right angle on said bracket;
   said top horizontal plate having a means for movably mounting a plumb line or a surveying rod; and
   said adjustable bottom horizontal plate having an aperture to receive a center point or a point of a surveying rod.

2. A surveying rod leveling device as set forth in claim 1 wherein said top horizontal plate further has an aperture to receive said means for mounting a plumb line and an aperture for receiving said center point.

3. A surveying rod leveling device comprising: a surveying rod having a level attached; an elongated bracket for mounting on a vertical surface;
   a top horizontal plate mounted at right angles to said bracket;
   an adjustable bottom horizontal plate mounted at right angles to said bracket;
   said top horizontal plate having a movable joint mounted on the bottom of said plate for securing means for hanging a plumb line or for securing the surveying rod;
   means for hanging a plumb line and plumb bob from said movable joint; and
   said adjustable bottom plate having an aperture to receive a center point or the tip of said surveying rod.

4. A surveying rod leveling device as set forth in claim 3 wherein said top horizontal plate has means for securing the means for hanging said plumb line when not mounted to said movable joint and an aperture for securing said center point when not in place on said bottom plate 5. A method for checking the accuracy of a level on a surveying rod comprising:
   mounting an elongated bracket to a vertical surface, said bracket having a top horizontal plate mounted at a right angle, said bracket further having an adjustable bottom horizontal plate mounted at a right angle, said adjustable bottom plate having an aperture to receive a center point, said top horizontal plate having a movable joint and a means for hanging a plumb line;
   hanging a plumb line with a plumb bob from means secured to said movable joint on said top horizontal plate;
   adjusting said bottom plate to align said plumb bob over said center point in said bottom plate;
   securing said bottom plate in position when said center point is centered under said plumb bob;
   removing said plumb line and bob and said means for mounting said plumb line and bob from said top horizontal plate;
   removing said center point from said bottom plate;
   inserting the point of a surveying rod having a level attached into said aperture on said bottom plate;
   securing said surveying rod having a level attached into said movable joint at said top plate;
   checking indicators on said level of said surveying rod; and
   adjusting said level to read accurately.

* * * * *